United States Patent
Weber et al.

(10) Patent No.: US 9,102,798 B2
(45) Date of Patent: Aug. 11, 2015

(54) METHOD FOR PRODUCING LOW-HALOGEN POLYBIPHENYLSULFONE POLYMERS

(75) Inventors: Martin Weber, Maikammer (DE); Christian Maletzko, Altrip (DE); Gerhard Lange, Schriesheim (DE); Jörg Erbes, Karlsruhe (DE); Matthias Dietrich, Weinheim (DE); Nicolas Inchaurrondo, Mannheim (DE); Christoph Sigwart, Weinheim (DE)

(73) Assignee: BASF SE (DE)

( * ) Notice: Subject to any disclaimer, the term of this patent is extended or adjusted under 35 U.S.C. 154(b) by 177 days.

(21) Appl. No.: 13/391,082

(22) PCT Filed: Aug. 17, 2010

(86) PCT No.: PCT/EP2010/061924
§ 371 (c)(1),
(2), (4) Date: Feb. 17, 2012

(87) PCT Pub. No.: WO2011/020823
PCT Pub. Date: Feb. 24, 2011

(65) Prior Publication Data
US 2012/0149796 A1 Jun. 14, 2012

(30) Foreign Application Priority Data
Aug. 20, 2009 (EP) .................................... 09168231

(51) Int. Cl.
C08G 8/02 (2006.01)
C08G 75/23 (2006.01)
C08G 75/20 (2006.01)
C08L 81/06 (2006.01)

(52) U.S. Cl.
CPC ................ *C08G 75/23* (2013.01); *C08G 75/20* (2013.01); *C08L 81/06* (2013.01); *C08G 2261/3444* (2013.01)

(58) Field of Classification Search
CPC ......... C08G 75/23; C08G 75/20; C08L 81/06
USPC ......... 528/125, 126, 128, 173, 176, 179, 182, 528/193, 194; 525/471
See application file for complete search history.

(56) References Cited

U.S. PATENT DOCUMENTS

| | | | |
|---|---|---|---|
| 4,093,600 A | 6/1978 | Fan et al. | |
| 4,200,728 A | 4/1980 | Blinne et al. | |
| 4,794,155 A | 12/1988 | Woo et al. | |
| 5,047,496 A | 9/1991 | Eckel et al. | |
| 7,993,792 B2* | 8/2011 | Maier et al. | 429/492 |
| 8,222,342 B2 | 7/2012 | Weber et al. | |
| 2001/0047050 A1 | 11/2001 | Oyamada et al. | |
| 2002/0010307 A1 | 1/2002 | Schwab | |
| 2005/0228149 A1* | 10/2005 | Trivedi et al. | 525/535 |
| 2010/0270140 A1 | 10/2010 | Siegert et al. | |
| 2010/0280195 A1 | 11/2010 | Siegert et al. | |
| 2010/0286303 A1 | 11/2010 | Weber et al. | |
| 2010/0324311 A1 | 12/2010 | Siegert et al. | |
| 2011/0009566 A1 | 1/2011 | Jain et al. | |
| 2011/0098372 A1 | 4/2011 | Aulenta et al. | |
| 2011/0155309 A1 | 6/2011 | Steininger et al. | |
| 2011/0178205 A1 | 7/2011 | Weber et al. | |
| 2011/0201747 A1 | 8/2011 | Weber et al. | |
| 2011/0218294 A1 | 9/2011 | Weber et al. | |
| 2011/0224386 A1 | 9/2011 | Weber et al. | |
| 2011/0237693 A1 | 9/2011 | Weber et al. | |
| 2011/0237694 A1 | 9/2011 | Weber et al. | |
| 2011/0244743 A1 | 10/2011 | Scherzer et al. | |
| 2011/0251337 A1 | 10/2011 | Weber et al. | |
| 2011/0294912 A1 | 12/2011 | Weber et al. | |
| 2011/0306701 A1 | 12/2011 | Weber et al. | |
| 2011/0319550 A1 | 12/2011 | Weber et al. | |
| 2012/0029106 A1 | 2/2012 | Weber et al. | |
| 2012/0059109 A1 | 3/2012 | Weber et al. | |
| 2012/0083541 A1 | 4/2012 | Khvorost et al. | |
| 2012/0083579 A1 | 4/2012 | Weber et al. | |
| 2012/0088048 A1 | 4/2012 | Scherzer et al. | |
| 2012/0107509 A1 | 5/2012 | Scherzer et al. | |
| 2012/0108693 A1 | 5/2012 | Gibon et al. | |
| 2012/0149796 A1 | 6/2012 | Weber et al. | |

FOREIGN PATENT DOCUMENTS

| | | |
|---|---|---|
| DE | 1957091 A1 | 6/1970 |
| DE | 2719305 A1 | 11/1977 |
| DE | 10117715 A1 | 11/2001 |
| EP | 000361 A1 | 1/1979 |
| EP | 0106023 A2 | 4/1984 |
| EP | 0347669 A2 | 12/1989 |
| EP | 1272547 A2 | 1/2003 |
| GB | 1264900 A | 2/1972 |
| WO | WO-00/18824 A1 | 4/2000 |
| WO | WO-2009034114 A1 | 3/2009 |
| WO | WO-2009027434 A3 | 5/2009 |
| WO | WO-2009127614 A1 | 10/2009 |
| WO | WO-2010/089241 A1 | 8/2010 |
| WO | WO-2011/009798 A1 | 1/2011 |
| WO | WO-2011/051197 A1 | 5/2011 |
| WO | WO-2011/073196 A1 | 6/2011 |
| WO | WO-2011/073197 A1 | 6/2011 |

OTHER PUBLICATIONS

International Preliminary Report on Patentability from corresponding International Application No. PCT/EP2010/061924 dated Mar. 6, 2012.
U.S. Appl. No. 13/504,717.
Viswanathan, et al., Polymer, 1984, vol. 25, December, pp. 1827-1836 "Synthesis, kinetic observations and characteristics of polyarylene ether sulphones prepared via a potassium carbonate DMAC process".
International Search Report for PCT/EP2010/061924 mailed Nov. 4, 2010.

* cited by examiner

*Primary Examiner* — Shane Fang
(74) *Attorney, Agent, or Firm* — Drinker Biddle & Reath LLP

(57) ABSTRACT

The present invention relates to a process for the production of low-halogen-content polybiphenyl sulfone polymers, to the resultant polybiphenyl sulfone polymers, to polybiphenyl sulfone polymers having less than 400 ppm content of polymer-bonded halogen, to thermoplastic molding compositions comprising these polybiphenyl sulfone polymers, and to their use for the production of moldings, of fibers, of films, of membranes, or of foams.

15 Claims, No Drawings

METHOD FOR PRODUCING LOW-HALOGEN POLYBIPHENYLSULFONE POLYMERS

CROSS-REFERENCE TO RELATED APPLICATIONS

This application is a national stage application (under 35 U.S.C. §371) of PCT/EP2010/061924, filed Aug. 17, 2010, which claims benefit of European application 09168231.0, filed Aug. 20, 2009.

BACKGROUND OF THE INVENTION

The present invention relates to a process for the production of low-halogen-content polybiphenyl sulfone polymers, to the resultant polybiphenyl sulfone polymers, to polybiphenyl sulfone polymers having less than 400 ppm content of polymer-bonded halogen, to thermoplastic molding compositions comprising these polybiphenyl sulfone polymers, and to their use for the production of moldings, of fibers, of films, of membranes, or of foams.

Polybiphenyl sulfone polymers are members of the polyarylene ether group and are therefore engineering thermoplastics. Polybiphenyl sulfone polymers have not only high heat resistance but also excellent notched impact resistance and excellent fire performance.

Production of polybiphenyl sulfone polymers is known by way of example from DE 1957091, EP 000361, and EP 0 347 669. WO 2000/018824 discloses a process for the production of polybiphenyl sulfone polymers having low content of cyclic oligomers. EP 1272547 describes polybiphenyl sulfone polymers with particularly low level of intrinsic color, obtained via condensation of the monomers 4,4'-dihydroxybiphenyl and 4,4'-dichlorodiphenyl sulfone in the presence of fine-particle potash. The prior art usually uses equimolar amounts of the starting materials.

However, the content of polymer-bonded halogen, in particular chlorine in the polybiphenyl sulfone polymers resulting from the known processes is too high for many applications and often fails to comply with fire-protection requirements. Applications in the electronics sector, e.g. switches, casings, foils, often demand very low chlorine contents. Furthermore, the intrinsic color of the polybiphenyl sulfone polymers obtainable from prior-art methods is often unsatisfactory. It would therefore be desirable to have polybiphenyl sulfone polymers with a particularly low level of intrinsic color. In many instances, the tensile strain at break of polybiphenyl sulfone polymers known from the prior art is moreover inadequate.

The person skilled in the art is aware from J. E. McGrath et. al., Polymer 25 (1984), 1827 of a method for controlling molecular weight during condensation of polyarylene sulfones based on bisphenol A. Commercial polyarylene ethers, e.g. Sumika Excel®, have predominantly chlorine end groups. There is no process known hitherto for the production of polybiphenyl sulfone polymers using an excess of the aromatic dihydroxy compound in the presence of water and/or of a metal hydroxide.

The intention was to eliminate, or reduce the extent of, the abovementioned disadvantages in the polybiphenyl sulfone polymers of the present invention. A particular object of the present invention was to provide a process which can produce polybiphenyl sulfone polymers and which permits production of these with good molecular-weight control. The intention was moreover that the polybiphenyl sulfone polymers have low viscosity at low shear rate and in particular exhibit good flow within a mold.

The object of the present invention in particular consisted in providing polybiphenyl sulfone polymers which have superior mechanical properties, comprise low content of polymer-bonded halogen, in particular chlorine, and moreover, in comparison with the prior art, have reduced residual solvent content. The prior art has not disclosed polybiphenyl sulfone polymers having less than 400 ppm content of polymer-bonded halogen, in particular chlorine. A further intention was that the level of intrinsic color in the polybiphenyl sulfone polymers be low.

The present object is achieved via a process for the production of polybiphenyl sulfone polymers comprising (a) provision of components (a1) composed of at least one aromatic dihydroxy compound and (a2) composed of at least one aromatic sulfone compound having two halogen substituents, where component (a1) comprises 4,4'-dihydroxybiphenyl, and then (b) reaction of component (a2) with a molar excess of component (a1) in a solvent, where water and/or a metal hydroxide is added during or after the reaction.

Preferred embodiments are found in the claims and in the description below. Combinations of preferred embodiments are within the scope of the present invention, particularly in respect of combinations of preferred embodiments of steps (a) and (b) set out hereinafter.

Step (a)

Step (a) of the process of the invention comprises provision of components (a1) composed of at least one aromatic dihydroxy compound and (a2) composed of at least one aromatic sulfone compound having two halogen substituents, where component (a1) comprises 4,4'-dihydroxybiphenyl.

Polybiphenyl sulfone polymers are polyarylene ether sulfones which comprise 4,4'-dihydroxybiphenyl as monomer unit. The term polybiphenyl sulfone polymer therefore comprises inter alia polybiphenyl sulfone homo- and copolymers. Polyarylene ether sulfones are polymers in which arylene units are present linked by way of oxygen bridges and also by way of sulfone bridges. A polybiphenyl sulfone polymer composed exclusively of the monomer units 4,4'-dihalodiphenyl sulfone and 4,4'-dihydroxybiphenyl is termed polybiphenyl sulfone (PPSU).

For the purposes of the present invention, the structure of the polybiphenyl sulfone polymers is characterized by reference to the monomer units used. It is obvious to the person skilled in the art that the monomer units are present in reacted form in the polymer, and that the reaction of the monomer units takes place via nucleophilic aromatic polycondensation with, theoretically, cleavage of one hydrogen halide unit as leaving group. The structure of the resultant polymer does not therefore depend on the precise nature of the leaving group.

In the invention, component (a1) is composed of at least one aromatic dihydroxy compound and comprises 4,4'-dihydroxybiphenyl. Component (a1) can moreover in particular comprise the following compounds:

dihydroxybenzenes, in particular hydroquinone and resorcinol;

dihydroxynaphthalenes, in particular 1,5-dihydroxynaphthalene, 1,6-dihydroxynaphthalene, 1,7-dihydroxynaphthalene, and 2,7-dihydroxynaphthalene;

dihydroxybiphenyls other than 4,4'-dihydroxybiphenyl, in particular 2,2'-dihydroxybiphenyl;

bisphenyl ethers, in particular bis(4-hydroxyphenyl)ether and bis(2-hydroxyphenyl)ether;

bisphenylpropanes, in particular 2,2-bis(4-hydroxyphenyl)propane, 2,2-bis(3-methyl-4-hydroxyphenyl)propane, and 2,2-bis(3,5-dimethyl-4-hydroxyphenyl)propane;

bisphenylmethanes, in particular bis(4-hydroxyphenyl) methane;

bisphenylcyclohexanes, in particular bis(4-hydroxyphenyl)-2,2,4-trimethylcyclohexane;

bisphenyl sulfones, in particular bis(4-hydroxyphenyl)sulfone;

bisphenyl sulfides, in particular bis(4-hydroxyphenyl)sulfide;

bisphenyl ketones, in particular bis(4-hydroxyphenyl)ketone;

bisphenylhexafluoropropanes, in particular 2,2-bis(3,5-dimethyl-4-hydroxyphenyl)hexafluoropropane; and bisphenylfluorenes, in particular 9,9-bis(4-hydroxyphenyl)fluorene.

Component (a1) preferably comprises at least 50% by weight, in particular at least 60% by weight, particularly preferably at least 80% by weight, of 4,4'-dihydroxybiphenyl. Component (a1) is very particularly preferably 4,4'-dihydroxybiphenyl.

For the purposes of component (a2), the person skilled in the art is in principle aware of suitable aromatic sulfone compounds having two halogen substituents. Particularly preferred compounds (a2) are dihalodiphenyl sulfones, such as 4,4'-dichlorodiphenyl sulfone, 4,4'-difluorodiphenyl sulfone, 4,4'-dibromodiphenyl sulfone, bis(2-chlorophenyl) sulfones, 2,2'-dichlorodiphenyl sulfone, and 2,2'-difluorodiphenyl sulfone. Particular preference is given to 4,4'-dichlorodiphenyl sulfone and 4,4'-difluorodiphenyl sulfone. Very particular preference is given to 4,4'-dichlorodiphenyl sulfone.

Particular preference is given to the reaction of 4,4'-dihydroxybiphenyl as component (a1) and 4,4'-dihalodiphenyl sulfone as component (a2), the product of which is polybiphenyl sulfone (PPSU).

Step (b)

In the present invention, the process for the production of polybiphenyl sulfone polymers comprises reaction of component (a2) with a molar excess of component (a1) in a solvent, where water and/or a metal hydroxide is added during or after the reaction of components (a1) and (a2).

The water and/or metal hydroxide mentioned is hereinafter referred to in general terms as "hydroxide source".

The use of an excess of component (a1), in combination with the use of the hydroxide source, and in particular in association with the addition of the hydroxide source at high conversions, helps to reduce the content of polymer-bonded halogen, in particular chlorine.

The person skilled in the art is aware of the reaction of components (a1) and (a2) to give a polybiphenyl sulfone polymer, in terms of temperature, solvent, and time. The reaction of starting compounds (a1) and (a2) is carried out at a temperature of from 80 to 250° C., preferably from 100 to 220° C., where the upper temperature limit is a function of the boiling point of the solvent. The reaction time is preferably from 2 to 12 h, in particular from 3 to 8 h.

The molar ratio of components (a1) to (a2) is preferably from 1.005 to 1.2, in particular from 1.005 to 1.1. In one particularly preferred embodiment, the molar ratio of components (a1) to (a2) is from 1.005 to 1.08, in particular from 1.01 to 1.05, very particularly preferably from 1.015 to 1.04. This is a particularly effective method of controlling molecular weight, with a simultaneous advantageous effect on the resultant content of polymer-bonded halogen, in particular chlorine.

The amount added of the hydroxide source, i.e. water, metal hydroxide, or a mixture composed of water and metal hydroxide is preferably from 0.1 to 10 parts by weight, in particular from 0.5 to 6 parts by weight, particularly preferably from 1 to 5 parts by weight, based on 100 parts by weight of components (a1) and (a2).

A hydroxide source that can be used is in particular water, alkali metal hydroxides, and alkaline earth metal hydroxides, and also these compounds in mixtures and/or aqueous solutions. Preferred hydroxide sources are water and alkali metal hydroxides. Preferred alkali metal hydroxides are LiOH, NaOH, and KOH. Aqueous solutions of the abovementioned metal hydroxides are particularly preferred, particularly aqueous solutions of abovementioned alkali metal hydroxides. It is therefore particularly advantageous that the hydroxide source comprises alkali metal hydroxides, in particular LiOH, NaOH, and/or KOH.

Various methods can be used for adding the hydroxide source. Addition in dilute form is preferred, where the amount to be added of the hydroxide source is preferably dissolved in advance in a solvent which is the same as that in which the reaction is carried out.

The juncture of addition of the hydroxide source can likewise vary. In the invention, the reaction is begun in the absence of the hydroxide source. According to step (b), therefore, a prereaction or the reaction is first carried out in the solvent, and then the hydroxide source is added, so that the hydroxide source is present during the continued reaction or after the reaction of components (a1) and (a2).

In one particularly preferred embodiment, at the juncture of addition of the hydroxide source the reaction during which the polycondensation reaction proceeds has been substantially concluded. In this case, water and/or metal hydroxides is/are added after the reaction of components (a1) and (a2), i.e. after the polycondensation reaction. This method of conducting the reaction effectively avoids molecular-weight degradation.

Reaction of components (a1) and (a2) means the polycondensation process to form a polybiphenyl sulfone polymer. If a prereaction is used, the mixture present at the juncture of addition of the hydroxide source is still reactive.

It is preferable that the addition of the hydroxide source takes place at conversion of at least 90%, in particular at least 95%, very particularly preferably at least 98%. For the purposes of the present invention, conversion is in principle the molar ratio of reacted halogen. Groups of component (a2) to the total amount of reacted and unreacted halogen groups of component (a2). At the abovementioned conversions, the polycondensation reaction has been substantially concluded. The temperature during the continued reaction (afterreaction) is preferably from 100 to 200° C., in particular from 130° C. to 180° C. The person skilled in the art will select the precise afterreaction temperature as a function of the solvent selected.

It is advantageous for the present invention to select the reaction conditions in such a way that conversion at the end of step (b) is at least 95%, particularly preferably at least 98%, in particular at least 99%. The molecular weight distribution of the final product varies, and may include oligomers, the end groups being either halogen groups or hydroxy groups or, after further reaction, alkyl- or aryloxy groups, and these groups correspond to the calculated difference from 100% conversion.

In one preferred embodiment, immediately prior to, or simultaneously, or immediately after the addition of the hydroxide source, the temperature is reduced, particularly preferably by from 15 to 80° C., in particular from 20 to 45° C., from the temperature during the reaction of components (a1) and (a2), i.e. the temperature during the polycondensation reaction. An effective method of reducing the temperature of the reaction mixture uses a suitable amount of solvent to dilute the hydroxide source before it is added, where the temperature of the solvent is low, in particular room temperature.

The afterreaction time after addition of the hydroxide source can vary widely. The time taken by the afterreaction with the hydroxide source is usually from 15 minutes to 8 hours, in particular from 30 minutes to 4 hours, particularly preferably from 1 to 3 hours.

With no intended restriction, it is believed that the addition of the hydroxide source in the invention brings about substitution of the halogen end groups, with a reduction in the content of polymer-bonded halogen, in particular chlorine.

In the present invention, the reaction of components (a1) and (a2) takes place in a solvent. Preferred solvents are polar aprotic solvents. The boiling point of suitable solvents here is in the range from 80 to 320° C., in particular from 100 to 280° C., preferably from 150 to 250° C. Particularly suitable polar aprotic solvents are high-boiling-point ethers, esters, ketones, asymmetrically halogenated hydrocarbons, anisole, dimethylformamide, dimethyl sulfoxide, sulfolane, N-ethyl-2-pyrrolidone and N-methyl-2-pyrrolidone (N-methylpyrrolidone, NMP), and also mixtures of the abovementioned solvents.

Surprisingly, particularly low content of polymer-bonded halogen, in particular chlorine is obtained when the solvent used comprises N-methylpyrrolidone. Very particular preference is given to N-methylpyrrolidone as solvent. N-Methylpyrrolidone simultaneously helps to give high conversion of components (a1) and (a2), since the reaction of the monomers used in the invention proceeds particularly efficiently.

The reaction of components (a1) and (a2) preferably takes place in the presence of a base (B), in order to increase reactivity with respect to the halogen substituents of the starting compounds (a2). A preferred method starts from the abovementioned aromatic dihydroxy compounds (a1) and adds a base (B) to produce their dipotassium or disodium salts and react these with component (a2). The person skilled in the art is aware of suitable bases (B).

Particularly preferred bases (B) are alkali metal carbonates. Particularly advantageous results are obtained in relation to intrinsic color, mechanical properties, and content of polymer-bonded halogen, in particular chlorine by combining use of alkali metal carbonates as base (B) with the method according to the claims for conduct of the process.

The bases are preferably anhydrous. Particularly suitable bases are anhydrous alkali metal carbonate, preferably sodium carbonate, potassium carbonate, or calcium carbonate, or a mixture thereof, very particular preference being given to potassium carbonate, and in particular to potassium carbonate with volume-average particle size less than 150 micrometers, determined by particle-size measurement equipment in a suspension in a mixture composed of chlorobenzene/sulfolane (proportion by weight: 60/40). A particularly preferred combination is N-methyl-2-pyrrolidone as solvent and anhydrous potassium carbonate as base (B).

It has also proven advantageous for the purposes of step (b) to adjust the amount of the polybiphenyl sulfone polymer, based on the total weight of the mixture composed of polybiphenyl sulfone polymer and solvent, to from 10 to 70% by weight, preferably from 15 to 50% by weight.

In one preferred embodiment, during or after the reaction according to step (b) at least one aromatic organic monochloro compound is added as component (a3).

With no intended restriction, it is believed that the aromatic organic monochloro compound acts as chain regulator. It is preferable that the reactivity of the aromatic organic monochloro compound is similar to that of component (a2) for the purposes of the reaction in step (b).

Component (a3) is preferably an aromatic monochloro sulfone, in particular 4-mono-chlorodiphenyl sulfone. In one preferred embodiment, the excess of component (a1) is compensated via the organic monochloro compound (a3) which comprises a chlorine group reactive under the conditions of the reaction of components (a1) and (a2).

It is preferable to select the molar amount of component (a3) in such a way that the excess of the molar amount of component (a1) over the molar amount of component (a2) expressed as a ratio to the molar amount of component (a3) and then multiplied by two is from 0.98 to 1.02, in particular from 0.99 to 1.01. Accordingly, $2*((a1)-(a2))/(a3)$ is preferably from 0.98 to 1.02, in particular from 0.99 to 1.01, where (a1), (a2), and (a3) are the molar amounts used of the respective component. It is preferable that the ratio $((a1)-(a2)/(a3))$ multiplied by two is 1.

In another preferred embodiment, which can be advantageously linked to the abovementioned embodiments, a reaction with at least one aliphatic organic halogen compound takes place according to step (c), following step (b). The result is further reaction of reactive hydroxy end groups, stabilization of the polymer, and thus inter alia further extension of the polymer chain during the course of further processing.

Preferred aliphatic organic halogen compounds are alkyl halides, in particular alkyl chlorides, having linear or branched alkyl groups having from 1 to 10 carbon atoms, in particular primary alkyl chlorides, particularly preferably methyl halide, in particular methyl chloride.

The reaction according to step (c) is preferably carried out at a temperature of from 90° to 160° C., in particular from 100° C. to 150° C. The time can vary widely and is usually at least 5 minutes, in particular at least 15 minutes. The reaction time according to step (c) is preferably from 15 minutes to 8 hours, in particular from 30 minutes to 4 hours.

Various methods can be used for the addition of the aliphatic organic halogen compound. The amounts added of the aliphatic organic halogen compound can moreover be stoichiometric or represent an excess, where the excess can by way of example be up to a 5-fold excess. In one preferred embodiment, the aliphatic organic halogen compound is added continuously, in particular via continuous introduction in the form of a stream of gas.

It has proven advantageous, following step (b) or, respectively, step (c), to filter the polymer solution. Salt content formed during the polycondensation reaction, and also any gel formed, is thus removed.

Polybiphenyl Sulfone Polymers

The present invention further provides polybiphenyl sulfone polymers obtainable according to the process of the invention, and also polybiphenyl sulfone polymers having less than 400 ppm content of polymer-bonded halogen, in particular chlorine, in particular less than 300 ppm, particularly preferably less than 200 ppm.

The content of polymer-bonded halogen, in particular chlorine in the polybiphenyl sulfone polymers of the invention is preferably less than 400 ppm, in particular less than 300 ppm, particularly preferably less than 200 ppm. Because of the nature of the process, the lower limit for content of polymer-bonded halogen, in particular chlorine is usually at least 10 ppm, in particular at least 20 ppm.

The halogen content of the resultant polymer is the content of halogen end groups and for the purposes of the present invention is determined by means of atomic spectroscopy. For the purposes of the present invention, the content of polymer-bonded halogen, in particular chlorine is in principle based on the proportion by weight and can as an alternative be stated in mg per kg of starting polymer.

The content of polymer-bonded halogen, in particular chlorine in polymer compositions obtainable by the process of the invention is particularly preferably less than 400 ppm with simultaneous content of less than 300 ppm of residual solvent.

Another feature of the polybiphenyl sulfone polymers of the invention is more than 50% tensile strain at break in the tensile test.

The present invention further provides thermoplastic molding compositions comprising a polybiphenyl sulfone polymer of the invention.

The thermoplastic molding compositions of the present invention can comprise not only the polybiphenyl sulfone polymer of the invention but also at least one polymer selected from polyarylene ether sulfones (other than the polybiphenyl sulfone polymers of the invention), in particular polyether sulfone (PES) and/or polysulfone (PSU), and also polyetherimides, polyphenylene sulfides, polyetherether ketones, polyimides, or poly-p-phenylenes.

The molding compositions of the invention can moreover comprise fillers, in particular fibers, particularly preferably glass fibers. The person skilled in the art is aware of appropriate fillers.

If fillers are used, the amount preferably added of these is from 5 to 150 parts by weight, based on 100 parts by weight of polymer.

In particular, any of the glass fibers known to the person skilled in the art and suitable for use in thermoplastic molding compositions may be present in the thermoplastic molding compositions of the invention. These glass fibers can be produced by processes known to the person skilled in the art and, can optionally be surface-treated. To improve compatibility with the matrix material, the glass fibers can have been sized, for example as described in DE 10117715.

In one preferred embodiment, glass fibers with diameter of from 5 to 15 μm are used, preferably from 7 to 13 μm, particularly preferably from 9 to 11 μm.

The form in which the glass fibers are incorporated can either be of chopped glass fibers or else that of continuous-filament strands (ravings). The length of glass fibers that can be used is generally and typically from 4 to 5 mm, prior to incorporation in the form of chopped glass fibers into the thermoplastic molding compositions. Once the glass fibers have been processed, for example by coextrusion, with the other components the average length of the glass fibers is generally from 100 to 400 μm, preferably from 200 to 350 μm.

The molding compositions of the invention can comprise, as further component K, auxiliaries, in particular processing aids, pigments, stabilizers, flame retardants, or a mixture of different additives. Other examples of conventional added materials are oxidation retarders, heat stabilizers, UV stabilizers, lubricants and mold-release agents, dyes, and plasticizers.

The content of the further components K in the molding compositions of the invention is in particular from 0 up to 30% by weight, preferably from 0 up to 20% by weight, in particular from 0 to 15% by weight, based on the total weight of the thermoplastic molding composition.

In the event that component K involves stabilizers, the content of these stabilizers is usually up to 2% by weight, preferably from 0.01 to 1% by weight, in particular from 0.01 to 0.5% by weight, based on the total weight of the thermoplastic molding composition.

The amounts generally comprised of pigments and dyes are from 0 to 10% by weight, preferably from 0.05 to 7% by weight, and in particular from 0.1 to 5% by weight, based on the total weight of the thermoplastic molding composition.

Pigments for the coloring of thermoplastics are well known, see for example R. Gächter and H. Müller, Taschenbuch der Kunststoffadditive [Plastics additives handbook], Carl Hanser Verlag, 1983, pages 494 to 510. A first preferred group of pigments that may be mentioned are white pigments, such as zinc oxide, zinc sulfide, white lead [2 $PbCO_3 \cdot Pb(OH)_2$], lithopones, antimony white, and titanium dioxide. Of the two most familiar crystalline forms of titanium dioxide (rutile and anatase), it is in particular the rutile form which is used for white coloring of the molding compositions of the invention. Black color pigments which can be used according to the invention are iron oxide black ($Fe_3O_4$), spinell black [$Cu(Cr, Fe)_2O_4$], manganese black (a mixture composed of manganese dioxide, silicon dioxide, and iron oxide), cobalt black, and antimony black, and also particularly preferably carbon black, which is mostly used in the form of furnace black or gas black. In this connection see G. Benzing, Pigmente für Anstrichmittel [Pigments for paints], Expert-Verlag (1988), pages 78 ff.

Particular color shades can be achieved by using inorganic chromatic pigments, such as chromium oxide green, or organic chromatic pigments, such as azo pigments or phthalocyanines. Pigments of this type are generally commercially available.

Examples of oxidation retarders and heat stabilizers which can be added to the thermoplastic molding compositions according to the invention are halides of metals of group I of the Periodic Table of the Elements, e.g. sodium halides, potassium halides, or lithium halides, examples being chlorides, bromides, or iodides. Zinc fluoride and zinc chloride can moreover be used. It is also possible to use sterically hindered phenols, hydroquinones, substituted representatives of said group, secondary aromatic amines, optionally in combination with phosphorus-containing acids, or to use their salts, or a mixture of said compounds, preferably in concentrations up to 1% by weight, based on the total weight of the thermoplastic molding composition.

Examples of UV stabilizers are various substituted resorcinols, salicylates, benzotriazoles, and benzophenones, the amounts generally used of these being up to 2% by weight.

Lubricants and mold-release agents, the amounts of which added are generally up to 1% by weight, based on the total weight of the thermoplastic molding composition, are stearyl alcohol, alkyl stearates, and stearamides, and also esters of pentaerythritol with long-chain fatty acids. It is also possible to use dialkyl ketones, such as distearyl ketone.

The molding compositions of the invention comprise, as preferred constituent, from 0.1 to 2% by weight, preferably from 0.1 to 1.75% by weight, particularly preferably from 0.1 to 1.5% by weight, and in particular from 0.1 to 0.9% by weight (based on the total weight of the thermoplastic molding composition) of stearic acid and/or stearates. Other stearic acid derivatives can in principle also be used, examples being esters of stearic acid.

Stearic acid is preferably produced via hydrolysis of fats. The products thus obtained are usually mixtures composed of stearic acid and palmitic acid. These products therefore have a wide softening range, for example from 50 to 70° C., as a function of the constitution of the product. Preference is given to use of products with more than 20% by weight content of stearic acid, particularly preferably more than 25% by weight. It is also possible to use pure stearic acid (>98% by weight).

The molding compositions of the invention can moreover also comprise stearates. Stearates can be produced either via reaction of corresponding sodium salts with metal salt solutions (e.g. $CaCl_2$, $MgCl_2$, aluminum salts) or via direct reaction of the fatty acid with metal hydroxide (see for example Baerlocher Additives, 2005). It is preferable to use aluminum tristearate.

The constituents of the thermoplastic molding composition of the invention can be mixed in any desired sequence.

The molding compositions of the invention can be produced by processes known per se, for example extrusion. The molding compositions of the invention can by way of example be produced by mixing the starting components in conventional mixing devices, such as screw-based extruders, preferably twin-screw extruders, Brabender mixers, or Banbury mixers, or else kneaders, followed by extrusion. The extrudate is cooled and comminuted. The sequence of mixing of the components can be varied and, for example, two or optionally three components can be premixed, but it is also possible to mix all of the components together.

Intensive mixing is advantageous in order to maximize homogeneity of mixing. Average mixing times necessary for this are generally from 0.2 to 30 minutes, at temperatures of from 280 to 380° C., preferably from 290 to 370° C. The extrudate is generally cooled and comminuted.

The molding compositions of the invention feature, in addition to the abovementioned advantages, good flowability, high toughness, and a low level of intrinsic color. The molding compositions of the invention are therefore suitable for the production of moldings for household items, or for electrical or electronic components, and also for moldings for the vehicle sector.

The thermoplastic molding compositions of the invention can be used advantageously for the production of moldings, of fibers, of films, of membranes, or of foams. The present invention further provides moldings, fibers, films, membranes, and foams comprising the thermoplastic molding compositions of the invention.

The examples below provide further explanation of the invention, without restricting the same.

EXAMPLES

The intrinsic viscosity of the polybiphenyl sulfone polymers was determined in 1% strength N-methylpyrrolidone solution at 25° C.

The polybiphenyl sulfone polymers obtained were pelletized at melt temperature 370° C. in a twin-screw extruder (ZSK 18). Processing to give test specimens took place at melt temperature 375° C. and mold temperature 160° C.

The intrinsic color of the products was determined by measuring Yellowness Index (YI) to ASTM D1925 on injection-molded plaques of thickness 2 mm (melt temperature 375° C., mold temperature 160° C.).

The purity of the monomers used (4,4'-dichlorodiphenyl sulfone, 4,4'-dihydroxybiphenyl) was more than 99.5%.

Various qualities of anhydrous $K_2CO_3$ (potash) were used. The average particle size is volume-average particle diameter, and was determined with a Mastersizer 2000 particle-measurement device, on a suspension of the particles in a mixture composed of chlorobenzene/sulfolane (proportion by weight: 60/40).

Potash A: average particle size: 61 μm
Potash B: average particle size: 120 μm.

Comparative Example 1

A polyarylene ether was produced via nucleophilic aromatic polycondensation of 574.16 g (2.000 mol) of dichlorodiphenyl sulfone and 379.87 g (2.040 mol) of dihydroxybiphenyl, using 286.09 g (2.07 mol) of potassium carbonate (potash A) in 2100 ml of NMP. This mixture was kept at 190° C. for 6 hours. The mixture was then diluted by adding 1000 ml of NMP. The suspension was then reacted with methyl chloride (15 l/h) for 1 hour at 130° C. After cooling to 80° C., the suspension was discharged, the solid constituents were removed by filtration, and the polymer was isolated by precipitation in 1/9 NMP/water. The product was carefully washed with water and then dried in vacuo for 12 h at 120° C. The intrinsic viscosity of the product was 71.2 ml/g and the glass transition temperature was 225° C.

Comparative Example 2

A polyarylene ether was produced via nucleophilic aromatic polycondensation of 574.16 g (2.000 mol) of dichlorodiphenyl sulfone and 379.87 g (2.040 mol) of dihydroxybiphenyl, using 286.09 g (2.07 mol) of potassium carbonate (potash A) in 2100 ml of NMP. This mixture was kept at 190° C. for 6 hours. The mixture was then diluted by adding 1000 ml of NMP. The suspension was then reacted with methyl chloride (15 l/h) for 1 hour at 130° C. After cooling to 80° C., the suspension was discharged, the solid constituents were removed by filtration, and the polymer was isolated by precipitation in 1/9 NMP/water. The product was carefully washed with water and then dried in vacuo for 12 h at 120° C. The intrinsic viscosity of the product was 72.0 ml/g and the glass transition temperature was 225° C.

Comparative Example 3

A polyarylene ether was produced via nucleophilic aromatic polycondensation of 574.16 g (2.000 mol) of dichlorodiphenyl sulfone and 379.87 g (2.040 mol) of dihydroxybiphenyl, using 286.09 g (2.07 mol) of potassium carbonate (potash A) in 2100 ml of NMP. This mixture was kept at 190° C. for 8 hours. The mixture was then diluted by adding 1000 ml of NMP. The suspension was then reacted with methyl chloride (15 l/h) for 1 hour at 130° C. After cooling to 80° C., the suspension was discharged, the solid constituents were removed by filtration, and the polymer was isolated by precipitation in 1/9 NMP/water. The product was carefully washed with water and then dried in vacuo for 12 h at 120° C. The intrinsic viscosity of the product was 69.6 ml/g and the glass transition temperature was 225° C.

Comparative Example 4

A polyarylene ether was produced via nucleophilic aromatic polycondensation of 574.16 g (2.000 mol) of dichlorodiphenyl sulfone and 379.87 g (2.040 mol) of dihydroxybiphenyl, using 286.09 g (2.07 mol) of potassium carbonate (potash A) in 2100 ml of NMP. This mixture was kept at 190° C. for 10 hours. The mixture was then diluted by adding 1000 ml of NMP. The suspension was then reacted with methyl chloride (15 l/h) for 1 hour at 130° C. After cooling to 80° C., the suspension was discharged, the solid constituents were removed by filtration, and the polymer was isolated by precipitation in 1/9 NMP/water. The product was carefully washed with water and then dried in vacuo for 12 h at 120° C. The intrinsic viscosity of the product was 64.6 ml/g and the glass transition temperature was 223° C.

Inventive Example 5

A polybiphenyl sulfone polymer of the invention was produced via nucleophilic aromatic polycondensation of 574.16 g (2.000 mol) of dichlorodiphenyl sulfone and 379.87 g (2.040 mol) of dihydroxybiphenyl, using 286.09 g (2.07 mol) of potassium carbonate (potash B) in 2100 ml of NMP. This mixture was kept at 190° C. for 4 hours. The mixture was then diluted by adding 500 ml of NMP/30 ml of deionized water, and subjected to further stirring at 160° C. for 2 h. A further 500 ml of NMP were then added. The suspension was then reacted with methyl chloride (15 l/h) for 1 hour at 130° C. After cooling to 80° C., the suspension was discharged, the solid constituents were removed by filtration, and the polymer was isolated by precipitation in 1/9 NMP/water. The product was carefully washed with water and then dried in vacuo for 12 h at 120° C. The intrinsic viscosity of the product was 71.5 ml/g and the glass transition temperature was 225° C.

Inventive Example 6

A polybiphenyl sulfone polymer of the invention was produced via nucleophilic aromatic polycondensation of 574.16 g (2.000 mol) of dichlorodiphenyl sulfone and 379.87 g (2.040 mol) of dihydroxybiphenyl, using 286.09 g (2.07 mol) of potassium carbonate (potash B) in 2100 ml of NMP. This mixture was kept at 190° C. for 4 hours. The mixture was then diluted by adding 500 ml of NMP/30 ml of deionized water, and subjected to further stirring at 160° C. for one hour. A further 500 ml of NMP were then added. The suspension was then reacted with methyl chloride (15 l/h) for 1 hour at 130° C. After cooling to 80° C., the suspension was discharged, the solid constituents were removed by filtration, and the polymer was isolated by precipitation in 1/9 NMP/water. The product was carefully washed with water and then dried in vacuo for 12 h at 120° C. The intrinsic viscosity of the product was 71.5 ml/g and the glass transition temperature was 225° C.

Inventive Example 7

A polybiphenyl sulfone polymer of the invention was produced via nucleophilic aromatic polycondensation of 574.16 g (2.000 mol) of dichlorodiphenyl sulfone and 379.87 g (2.040 mol) of dihydroxybiphenyl, using 286.09 g (2.07 mol) of potassium carbonate (potash B) in 2100 ml of NMP. This mixture was kept at 190° C. for 4 hours. The mixture was then diluted by adding a mixture of 500 ml of NMP and 0.78 g of NaOH dissolved in 0.78 ml of deionized water, and subjected to further stirring at 160° C. for one hour. A further 500 ml of NMP were then added. The suspension was then reacted with methyl chloride (15 l/h) for 1 hour at 130° C. After cooling to 80° C., the suspension was discharged, the solid constituents were removed by filtration, and the polymer was isolated by precipitation in 1/9 NMP/water. The product was carefully washed with water and then dried in vacuo for 12 h at 120° C. The intrinsic viscosity of the product was 69.4 ml/g and the glass transition temperature was 224° C.

Inventive Example 8

A polybiphenyl sulfone polymer of the invention was produced via nucleophilic aromatic polycondensation of 574.16 g (2.000 mol) of dichlorodiphenyl sulfone and 379.87 g (2.040 mol) of dihydroxybiphenyl, using 286.09 g (2.07 mol) of potassium carbonate (potash B) in 2100 ml of NMP. This mixture was kept at 190° C. for 4 hours. The mixture was then diluted by adding a mixture of 500 ml of NMP and 1.56 g of NaOH dissolved in 1.56 ml of deionized water, and subjected to further stirring at 160° C. for one hour. A further 500 ml of NMP were then added. The suspension was then reacted with methyl chloride (15 l/h) for 1 hour at 130° C. After cooling to 80° C., the suspension was discharged, the solid constituents were removed by filtration, and the polymer was isolated by precipitation in 1/9 NMP/water. The product was carefully washed with water and then dried in vacuo for 12 h at 120° C. The intrinsic viscosity of the product was 68.5 ml/g and the glass transition temperature was 224° C.

Table 1 collates the properties of the polybiphenyl sulfone polymers from Examples comp 1 to comp 4 and 5 to 8 and subsequent extrusion as described above.

TABLE 1

| Example | comp 1 | comp 2 | comp 3 | comp 4 | 5 | 6 | 7 | 8 |
|---|---|---|---|---|---|---|---|---|
| Content of polymer-bonded halogen (chlorine) [ppm] | 710 | 670 | 560 | 540 | 330 | 360 | 120 | 70 |
| Solvent content [ppm] | 100 | 60 | 80 | 100 | 110 | 100 | 120 | 100 |
| Yellowness Index YI | 56 | 57 | 68 | 88 | 39 | 38 | 36 | 37 |

The comparative values for Radel® 5000, a polybiphenyl sulfone with intrinsic viscosity of 73.2 ml/g (1% by weight in NMP at RT) are: Cl content: 2900 ppm; solvent content: 2000 ppm, and YI: 67.

A particular feature of the molding compositions of the invention is therefore a combination of very low content of polymer-bonded halogen, in particular chlorine, low content of residual solvent, and good intrinsic color.

The invention claimed is:

1. A process for the production of polybiphenyl sulfone polymers comprising
   (a) providing components (a1) composed of at least one aromatic dihydroxy compound and (a2) composed of at least one aromatic sulfone compound having two halogen substituents, where component (a1) comprises 4,4'-dihydroxybiphenyl, and then
   (b) reacting component (a2) with a molar excess of component (a1) in a solvent using alkali metal carbonates as a base, where water and/or a metal hydroxide is added after the reaction and before precipitation,
   wherein according to step (b) the addition of water and/or of a metal hydroxide takes place at a conversion of at least 90%.

2. The process according to claim 1, where component (a2) is 4,4'-dichlorodiphenyl sulfone.

3. The process according to claim 1, where the metal hydroxide is an alkali metal hydroxide.

4. The process according to claim 1, where the solvent comprises N-methylpyrrolidone.

5. The process according to claim 1, where the molar ratio of component (a1) to (a2) is from 1.005 to 1.2.

6. The process according to claim 1, where component (a1) comprises at least 50% by weight of 4,4'-dihydroxybiphenyl.

7. The process according to claim 1, where component (a1) is 4,4'-dihydroxybiphenyl.

8. The process according to claim 1, where at least one aromatic organic monochloro compound is added as component (a3) during or after the reaction according to step (b).

9. The process according to claim 8, where component (a3) is 4-monochloro-diphenyl sulfone.

10. The process according to claim 8, where the ratio ((a1)−(a2))/(a3) multiplied by two is from 0.98 to 1.02, where (a1), (a2), and (a3) are the molar amounts of components (a1), (a2), and (a3) used.

11. The process according to claim 10, where the ratio ((a1)−(a2))/(a3) multiplied by two is one.

12. The process according to claim 1, where, following step (b), according to step (c) a reaction takes place with at least one aliphatic organic halogen compound.

13. The process according to claim 1, where, following step (b), according to step (c) a reaction takes place with at least one alkyl chloride.

14. The process according to claim 13, where the alkyl chloride is methyl chloride.

15. The process according to claim 1, wherein the amount of water and/or metal hydroxide added is from 0.1 to 10 parts by weight based on 100 parts by weight of components (a1) and (a2).

* * * * *